US008102882B2

(12) United States Patent
Wang et al.

(10) Patent No.: US 8,102,882 B2
(45) Date of Patent: Jan. 24, 2012

(54) SUBCARRIER TRUNCATING DATA TRANSMISSION SCHEME IN OFDM SYSTEM

(75) Inventors: Haifeng Wang, Oulu (FI); Fang Wang, JiangSu (CN); Ming Chen, JiangSu (CN); Shixin Cheng, Nanjing (CN)

(73) Assignee: Nokia Corporation, Espoo (FI)

( * ) Notice: Subject to any disclaimer, the term of this patent is extended or adjusted under 35 U.S.C. 154(b) by 1268 days.

(21) Appl. No.: 11/415,725

(22) Filed: May 2, 2006

(65) Prior Publication Data
US 2007/0258352 A1 Nov. 8, 2007

(51) Int. Cl.
*H04J 1/00* (2006.01)
(52) U.S. Cl. ........ 370/482; 370/208; 370/281; 370/295; 370/318; 370/480; 455/13.4; 375/260; 714/800
(58) Field of Classification Search .................. 370/208, 370/281, 295, 318, 480, 482, 260; 455/13.4; 714/800
See application file for complete search history.

(56) References Cited

U.S. PATENT DOCUMENTS

| 7,213,197 | B2 | 5/2007 | Jacobsen et al. | |
|---|---|---|---|---|
| 2003/0193889 | A1 | 10/2003 | Jacobsen | |
| 2004/0054959 | A1* | 3/2004 | Blankenship et al. | 714/800 |
| 2004/0128605 | A1* | 7/2004 | Sibecas et al. | 714/746 |
| 2005/0034053 | A1* | 2/2005 | Jacobsen et al. | 714/800 |
| 2005/0152466 | A1* | 7/2005 | Maltsev et al. | 375/260 |
| 2005/0208906 | A1* | 9/2005 | Miyoshi et al. | 455/122 |

FOREIGN PATENT DOCUMENTS

| CN | 1856976 A | | 11/2006 |
|---|---|---|---|
| WO | WO 2006/013705 A1 | * | 7/2005 |
| WO | 2007/004019 | | 11/2007 |

OTHER PUBLICATIONS

Cao et al., Degree Distribution based HARQ for Irregular LDPC, Mar. 2006, IEEE.*
Wong et al., Multiuser OFDM with Adaptive Subcarrier, Bit, and Power Allocation, Oct. 1999, IEEE.*
Jan. 2005, Xiao-Yu Hu, E. Eleftheriou, and Dieter M. Arnold, "Regular and Irregular Progressive Edge-Growth Tanner Graphs", IEEE Transaction on Information Theory, vol. 51, No. 1, pp. 386-398, Jan. 2005. (presented in part at 2001 IEEE Global Telecommunications Conference, San Antonio, TX, Nov. 2001).
Ardakani, M. et al., "Near-Capacity Coding in Multicarrier Modulation Systems", IEEE Trans. on Communications, vol. 52, No. 11, Nov. 2004, pp. 1880-1889.
Office Action with translation dated Aug. 31, 2011 from Chinese Application No. 200780021169.3, 34 pages.

* cited by examiner

*Primary Examiner* — Aung S Moe
*Assistant Examiner* — Hoon J Chung
(74) *Attorney, Agent, or Firm* — Hollingsworth & Funk, LLC

(57) ABSTRACT

A multicarrier data transmission scheme is provided. According to the provided scheme, a radio transmitter encodes data bits with different degrees, the degree of an encoded data bit being defined by the number of parity check equations protecting the data bit. The data bits are preferably encoded with an irregular low-density parity check (LDPC) code. The encoded data bits are then mapped to symbols. The symbols are allocated to subcarriers of a multicarrier radio signal on the basis of channel state information obtained from the radio receiver and the degree used with respect to each symbol. On the basis of the channel state information, a number of subcarriers are truncated due to high attenuation, and the number of subcarriers to be truncated relative to the total number of subcarriers is substantially fixed. The available transmit power to the non-truncated subcarriers. The multicarrier signal comprising symbols on the non-truncated subcarriers is then transmitted to the radio receiver.

23 Claims, 3 Drawing Sheets

SUBCARRIER TRUNCATING DATA TRANSMISSION SCHEME IN OFDM SYSTEM

FIELD

The invention relates to a subcarrier truncating data transmission scheme applied in an Orthogonal Frequency Division Multiplexing (OFDM) communication system.

BACKGROUND

Orthogonal frequency-division multiplexing (OFDM) has become a key technology in many wireless communication systems. It increases the robustness against frequency-selective fading. By using a cyclic prefix (CP) in an OFDM system, channel distortion can be easily complemented by a simple one-tap equalizer operating in a frequency domain. Frequency domain response of OFDM system is a random variable, in which some subcarriers may be deeply attenuated. The attenuation is typically caused by the frequency selective fading induced by a communication channel. Symbols transmitted in these deeply attenuated subcarriers will have much higher error probability. Accordingly, symbols transmitted on heavily attenuated subcarriers cannot be recovered in a receiver and, thus, they have been transmitted in vain. Thus, limited transmit power resource available at a transmitter has been wasted on these subcarriers.

One solution has been to combine power allocation and error-correcting codes. Assuming the transmitter has knowledge of channel state information, a power control is applied such that symbols allocated to heavily attenuated subcarriers are truncated, and the truncated power could be applied to less-attenuated subcarriers. Symbol erasures affected by the truncating operation could be handled by an error-correcting code.

Known power allocation schemes are based on a prescribed cutoff threshold. The symbols are transmitted only when the channel gain is above the cutoff threshold. Otherwise, no power is allocated for these corresponding symbols. In OFDM systems, the number of subcarriers may be several hundred or thousand, for example. Most of subcarriers in one frequency block may be deeply attenuated at the same time. Accordingly, most subcarriers in the frequency block will be truncated. This induces a very high frame error rate because the impacts of the truncation cannot be solved by an error correction code with a limited block length. On the other hand, if most of subcarriers in an OFDM block attenuate only mildly or do not attenuate practically at all, then this kind of power allocation strategy may not improve the system performance. Therefore, an improved data transmission scheme for OFDM data transmission in fading communication channels is needed.

BRIEF DESCRIPTION OF THE INVENTION

An object of the invention is to provide an improved data transmission scheme for OFDM data transmission.

According to an aspect of the invention, there is provided a data transmission method in a radio transmitter of a wireless multicarrier communication system. The method comprises obtaining channel state information describing attenuation effected by a radio channel to subcarriers used in the data transmission, encoding different portions of a plurality of data bits with different degrees, the degree of an encoded data bit being defined by the number of parity check equations protecting the data bit, mapping encoded data bits to symbols, allocating the symbols to subcarriers on the basis of the channel state information and the degree of encoded bits associated with each symbol, determining, on the basis of the channel state information, a number of subcarriers to be truncated due to high attenuation, the number of subcarriers to be truncated relative to the total number of subcarriers being substantially fixed, truncating the determined subcarriers, allocating the available transmit power to the non-truncated subcarriers, and transmitting a multicarrier signal comprising symbols on the non-truncated subcarriers.

According to another aspect of the invention, there is provided a radio transmitter of a multicarrier wireless communication system. The radio transmitter comprises a communication interface to provide a radio communication connection with at least one radio receiver, and a processing unit configured to obtain channel state information describing attenuation effected by a radio channel to subcarriers the radio transmitter uses in data transmission. The processing unit is further configured to encode different portions of a plurality of data bits with different degrees, the degree of an encoded data bit being defined by the number of parity check equations protecting the data bit, map encoded data bits to symbols, allocate the symbols to subcarriers on the basis of the channel state information and the degree of encoded bits associated with each symbol, determine, on the basis of the channel state information, a number of subcarriers to be truncated due to high attenuation, the number of subcarriers to be truncated relative to the total number of subcarriers used in the data transmission being substantially fixed, truncate the determined subcarriers, allocate the available transmit power to the non-truncated subcarriers, and transmit, through the communication interface, a multicarrier signal comprising the symbols on the non-truncated subcarriers.

According to another aspect of the invention, there is provided a radio receiver of a multicarrier wireless communication system. The radio receiver comprises a communication interface to provide a radio communication connection with the transmitter, and a processing unit configured to obtain channel state information from a signal received from a radio transmitter, the channel state information describing attenuation effected by a radio channel to subcarriers of a multicarrier signal the radio transmitter uses in data transmission. The processing unit is further configured to transmit the channel state information to the radio transmitter through the communication interface, receive a multicarrier signal comprising a plurality of subcarriers carrying symbols through the communication interface, determine which subcarriers of the received multicarrier signal have been truncated, the number of truncated subcarriers relative to the total number of subcarriers used in the data transmission being substantially fixed, obtain the symbols from non-truncated subcarriers, obtain information on the allocation of the symbols to the subcarriers, order the symbols on the basis of the obtained information, remove mapping of the ordered symbols, thereby obtaining encoded data bits, and decode the encoded data bits.

According to another aspect of the invention, there is provided a multicarrier wireless communication system. The multicarrier wireless communication system comprises a radio transmitter and a radio receiver. The radio transmitter comprises a communication interface to provide a radio communication connection with at least one radio receiver, and a processing unit configured to obtain channel state information describing attenuation effected by a radio channel to subcarriers the radio transmitter uses in data transmission, encode different portions of a plurality of data bits with different degrees, the degree of an encoded data bit being defined by the number of parity check equations protecting the data bit, map encoded data bits to symbols, allocate the symbols to subcarriers on the basis of the channel state information and the degree of encoded bits associated with each symbol, determine, on the basis of the channel state information, a number of subcarriers to be truncated due to high attenuation, the number of subcarriers to be truncated relative to the total number of subcarriers used in the data transmission being substantially fixed, truncate the determined subcarriers, allocate the available transmit power to the non-truncated subcarriers, and transmit, through the communication interface, a multicarrier signal comprising the symbols on the non-truncated subcarriers. The radio receiver comprises a communication interface to provide a radio communication connection with the transmitter, and a processing unit configured to obtain channel state information describing attenuation effected by a radio channel to subcarriers the radio transmitter uses in data transmission, transmit the channel state information to the radio transmitter through the communication interface of the radio receiver, receive a multicarrier signal comprising a plurality of subcarriers carrying symbols through the communication interface, determine which subcarriers of the received multicarrier signal have been truncated, the number of truncated subcarriers relative to the total number of subcarriers used in the data transmission being substantially fixed, obtain the symbols from non-truncated subcarriers, obtain information on the allocation of the symbols to the subcarriers, order the symbols on the basis of the obtained information, remove mapping of the ordered symbols, thereby obtaining encoded data bits, and decode the encoded data bits.

According to another aspect of the invention, there is provided a computer program distribution medium readable by a computer and encoding a computer program of instructions for executing a computer process for data transmission in a radio transmitter of a multicarrier wireless communication system. The process comprises obtaining channel state information describing attenuation effected by a radio channel to subcarriers used in the data transmission, encoding different portions of a plurality of data bits with different degrees, the degree of an encoded data bit being defined by the number of parity check equations protecting the data bit, mapping encoded data bits to symbols, allocating the symbols to subcarriers on the basis of the channel state information and the degree of encoded bits associated with each symbol, determining, on the basis of the channel state information, a number of subcarriers to be truncated due to high attenuation, the number of subcarriers to be truncated relative to the total number of subcarriers being substantially fixed, truncating the determined subcarriers, allocating the available transmit power to the non-truncated subcarriers, and transmitting a multicarrier signal comprising symbols on the non-truncated subcarriers.

The invention provides improved system performance in terms of data rates and reliability of data transmission.

LIST OF DRAWINGS

In the following, the invention will be described in greater detail with reference to the embodiments and the accompanying drawings, in which FIG. 1 shows structures of a radio transmitter and a radio receiver according to an embodiment of the invention;

DESCRIPTION OF EMBODIMENTS

Figure 1:
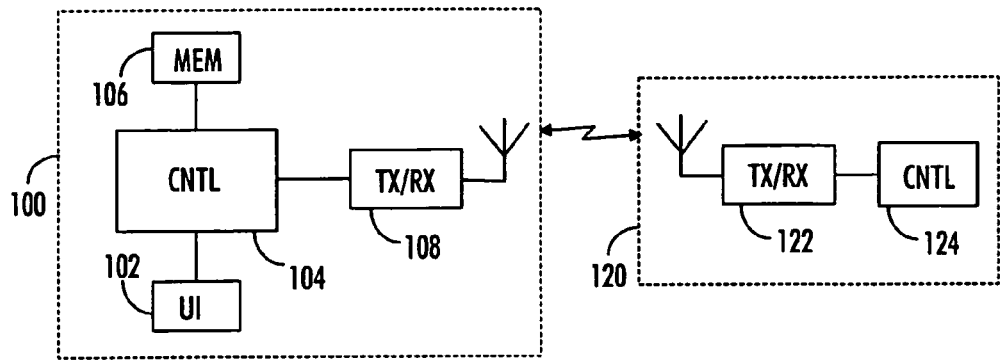

With reference to FIG. 1, examine an example of a wireless multicarrier communication system in which embodiments of the invention can be applied. The wireless multicarrier communication system may utilize an Orthogonal Frequency Division Multiplexing (OFDM) technique, for example. The wireless multicarrier communication system may be a wireless local area network (WLAN) according to IEEE 802.11x standard, a wideband code division multiple access (W-CDMA) mobile communication system, for example a Universal Mobile Telecommunication System providing high-speed Uplink or Downlink Packet Access (HSUPA or HSDPA) services, or a WiMAX communication system according to IEEE 802.16 standard. FIG. 1 illustrates a radio transmitter (a base station) 120 and a radio receiver (a mobile station) 100 according to an embodiment of the invention.

With reference to FIG. 1, examine an example of the structure of a radio receiver 100 and a radio transmitter 120 to which embodiments of the invention can be applied. The radio receiver 100 in FIG. 1 may be a mobile station 100 capable of wireless communications through a radio channel with at least a base station 120 providing services to the mobile station 100. The mobile station 100 may be capable of receiving information transmitted according to OFDM technique. The mobile station 100 may, for example, be a personal communication or information-processing device, such as a mobile phone or a PDA (Personal Digital Assistant).

The mobile station 100 comprises a communication interface 108 for transmitting and receiving information transmitted through the radio channel. The communication interface 108 may be configured to process received information signals and signals to be transmitted. The communication interface 108 may be configured to filter and amplify the received information signals as well as to convert the analog information signals into a digital form. The communication interface 108 may be configured to convert signals to be transmitted to analog waveforms and transmit the analog waveforms through the radio channel according to an OFDM technique, for example.

The mobile station 100 further comprises a processing unit 104 configured to control operations of the mobile station 100. The processing unit 104 may be configured to process information received through the communication interface 108. In particular, the processing unit 104 may be configured to perform digital signal processing algorithms on the received information signals in order to determine channel state information of the radio channel between the mobile station and the serving base station on the basis of a received reference signal. The reference signal may be a pilot signal for training sequence based channel quality estimation or a data signal for data aided channel quality estimation. The processing unit 104 may be further configured to process received multicarrier data signals in order to recover data bits carried by the multicarrier data signals. The processing unit 104 may be implemented with a digital signal processor provided with suitable software embedded on a computer readable medium, or with separate logic circuits, for example with ASIC (Application Specific Integrated Circuit).

The mobile station 100 may further comprise a memory unit 106 for storing information. The memory unit 106 may be of any non-volatile memory type. The memory unit 106 may store software necessary for the operation of the mobile station but also specific parameters necessary for the reception, processing, and transmission of radio signals.

The mobile station 100 may additionally comprise a user interface 102 for interaction between the mobile station and a user of the mobile station 100. The user interface 102 may include an input device such as a keyboard or a keypad, a display device, a microphone and a loudspeaker.

The serving base station 120 communicating with the mobile station 100 comprises a communication interface 122 and a processing unit 124. The communication interface 122 is configured to provide a communication connection with a plurality of mobile stations the base station 120 is serving within its coverage area. The base station 120 may have the capability to transmit and receive information according to OFDM technique, i.e. have the capability to transmit multi-carrier OFDM signals. The processing unit 124 of the base station 120 is configured to process signals transmitted and received through the communication interface 122. The processing unit 124 may be implemented with a digital signal processor provided with suitable software embedded on a computer readable medium, or with separate logic circuits, for example with ASIC (Application Specific Integrated Circuit).

Figure 2:
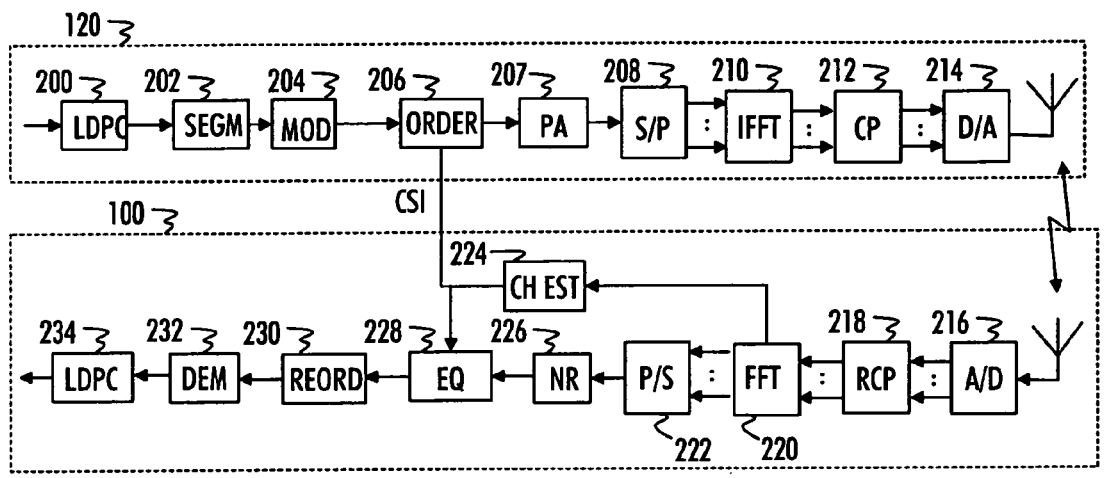
FIG. 2 illustrates block diagrams of the radio transmitter and a radio receiver according to embodiments of the invention.

Let us first consider the structure of the radio transmitter 120 with reference to the detailed block diagram illustrated in FIG. 2. As indicated by the reference numerals, the radio transmitter 120 may be the serving base station 120 and a radio receiver 100 illustrated in FIG. 2 may be the mobile station 100. First, the information bits to be transmitted are channel encoded in a channel encoder 200. In a preferred embodiment of the invention, the channel encoder 200 utilizes irregular low-density parity check (LDPC) codes when encoding the information bits. An LDPC encoder may be a block encoder which converts input bit words, each comprising a plurality of information bits, into encoded bit words having a higher number of bits. Typically, the LDPC encoder calculates a number of parity check bits from the input data bits. Consequently, the encoded bit words have redundant information which is utilized in the radio receiver 100 to combat the bit errors caused by a radio channel. The LDPC encoder may be implemented as a convolutional encoder as well. In this description, however, we focus on the block-type LDPC encoder for simplicity. LDPC codes as such are well known in coding theory and known to approach the Shannon channel capacity limit when utilized properly in data transmission. Irregular LDPC codes are known from the fact that input bits may be encoded with different degrees of coding strength, i.e. each input bit may be protected by a different number of parity check equations. This feature of irregular LDPC codes is utilized in this embodiment of the invention.

Let us consider a given block of data bits to be transmitted from the radio transmitter 120 to the radio receiver 100. The LDPC encoder 200 processes the data bits with an irregular LDPC code. A LDPC code can be represented by a bipartite graph, which consists of variable nodes, check nodes and a certain number of edges between these two types of node. Each variable node represents a bit of the codeword and each check nodes represents a parity check of the code. An edge exist between a variable node and a check node if and only if this bit is checked by this parity check equation. The degree of a node is the number of edges connected to this node. An irregular LDPC code has a bipartite graph in which the bit nodes (check nodes) have different degrees. A higher variable node degree means that a bit is protected by more parity check equations, which implies to a lower bit error probability. In practice, the LDPC encoder 200 encodes the data bits according to a parity check matrix which may be generated according to a "Progressive Edge Growth" (PEG) method described in X.-Y. Hu, E. Eleftheriou, and D.-M. Arnold, "Progressive edge-growth Tanner graphs," in Proc. IEEE GLOBECOM 2001, San Antonio, Tex., November 2001, pp. 995-1001, which has been incorporated herein as a reference. The parity check matrix defines how parity check bits should be calculated. That is, each parity check bit is calculated from given one or more data bits and parity bits. When encoding data bits with the regular LDPC codes, each data bit is protected by the same number of check equations. With irregular LDPC codes, the number of check equations used to protect a bit varies from bit to bit.

Accordingly, the LDPC encoder 200 outputs encoded data bits encoded with different variable node degrees. In this example, let us assume three variable node degrees. Let us further assume that the first variable node degree is the highest variable node degree, and the third variable node degree is the lowest variable node degree. Accordingly, the data bits encoded with the first variable node degree are protected by the highest number of parity check equations and the data bits encoded with the third variable node degree are protected by the lowest number of parity check equations.

Figure 3:
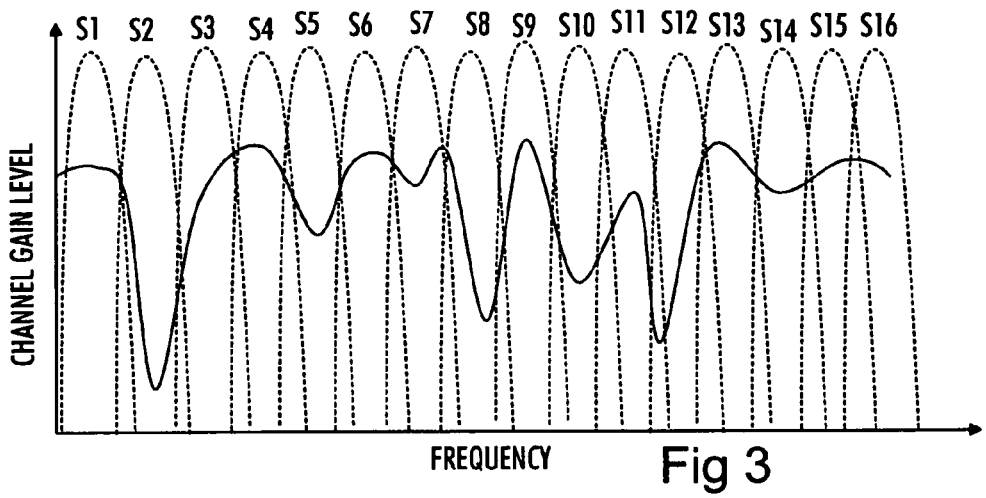
FIG. 3 illustrates channel state information and subcarriers utilized in an example used to describe an embodiment of the invention.

The encoded data bits are fed to a segmentation block 202 which segments the encoded data bits into segments having a size depending on a modulation scheme and the number of subcarriers the radio transmitter 120 uses in the data transmission. For example, if the number of subcarriers the radio transmitter 120 utilizes in the data transmission is N and the size of a symbol constellation the radio transmitter 120 uses when mapping the encoded data bits into symbols is M, the size of a segment is $L=N \cdot \log_2 M$. FIG. 3 illustrates an example of subcarriers S1 to S16 used in the data transmission. The subcarriers S1 to S16 are illustrated with a dashed line. The number of subcarriers in this example is 16 for the sake of simplicity, and in real implementations the number of subcarriers may be hundreds or even more. If a modulation scheme utilized in the data transmission is 16-QAM (Quadrature Amplitude Modulation), the size of the segment becomes $16 \cdot \log_2 16 = 64$ bits.

The segmentation block 202 feeds the segments of encoded data bits into a modulator 204 which maps the encoded data bits into symbols according to the symbol constellation used in the data transmission. As a result, N symbols per segment are obtained, and the symbols are fed to an ordering block 206.

The ordering block 206 allocates the symbols into subcarriers on the basis of the variable node degree associated with each symbol and a channel state information describing attenuation effected by a radio channel to subcarriers used in the data transmission. The radio transmitter 120 may receive the channel state information from the radio receiver 100 to which it is transmitting the data bits. The radio receiver 100 may calculate the channel state information, for example, from a reference signal transmitted from the radio transmitter 120 to the radio receiver 100. The reference signal may be a pilot signal. As mentioned above, the channel state information calculated by the radio receiver 100 describes how different subcarriers suffer from fading caused by the radio channel. Typically, some subcarriers may attenuate severely while others suffer only a mild fading. FIG. 3 illustrates an example of the channel state information the radio transmitter has obtained. The channel state information is illustrated with a solid line and it describes the gain effected by the radio channel to different frequencies and to different subcarriers S1 to S16 used in the data transmission. As can be seen, subcarriers S2, S8, and S12 suffer from severe fading with respect to subcarriers S4, S9, and S13, for example.

While the channel state information is drawn as a continuous expression in FIG. 3, the channel state information is typically described with discrete values in real implementations.

The ordering block 206 utilizes the obtained channel state information and the known variable node degrees associated with the symbols received from the modulator 204 when allocating the symbols to subcarriers S1 to S16. The ordering block 206 may allocate the symbols comprising bits encoded with the first degree (the highest number of parity check equations) to the subcarriers suffering the least from the attenuation. The symbols comprising bits encoded with the second degree (the second highest number of parity check equations) may be allocated to the subcarriers suffering from a moderate attenuation, and the symbols comprising bits encoded with the third degree (the lowest number of parity check equations) may be allocated to the subcarriers suffering from the severest attenuation. For example, the symbols associated with the first degree may be allocated at least to subcarriers S4, S6, S9, and S13; the symbols associated with the second degree may be allocated at least to subcarriers S1, S5, S11, and S14, and symbols associated with the third degree may be allocated at least to subcarriers S2, S8, S10, and S12. In this case, it is assumed that there are at least four symbols associated with each variable node degree. In general, the symbols are allocated to the subcarriers such that a variable node degree associated with a symbol is inversely proportional to the channel gain associated with the subcarrier the symbol is allocated to.

Next, the ordering block 206 may determine, on the basis of the channel state information, a number of subcarriers to be truncated due to high attenuation. According to an embodiment of the invention, the number of subcarriers to be truncated relative to the total number of subcarriers is substantially fixed. In our example, let us assume that the number of subcarriers to be truncated relative to the total number of subcarriers is ¼, i.e. four of the total 16 subcarriers are to be truncated. Accordingly, the ordering block 206 determines four subcarriers which suffer from the heaviest attenuation. Referring to FIG. 3, the truncated subcarriers would be S2, S8, S10, and S12. The ordering block 206 then generates a message that these subcarriers are to be truncated, i.e. no symbols are to be transmitted on these subcarriers S2, S8, S10, and S12. The ordering block then feeds the symbols, allocation information and the message of the truncated subcarriers to a power allocation block 207.

The power allocation block 207 allocates a transmit power available at the radio transmitter for transmission of the symbols according to the information received from the ordering block 206. The power allocation block 207 may allocate the available transmit power to the non-truncated subcarriers. Accordingly, no transmit power is allocated to the truncated subcarriers. This means that the non-truncated subcarriers may be transmitted with a higher transmit power level than without the truncation of heavily attenuating subcarriers. Consequently, the transmission of the symbols on the non-truncated subcarriers becomes more reliable. The available transmit power may be allocated to the non-truncated subcarriers according to several schemes, as will be described in detail below.

The power allocated symbols are then fed to a serial-to-parallel (S/P) converter 208 which converts the symbol in a serial form to symbols in a parallel form on the basis of the allocation information received from the ordering block 206. The number of parallel streams from the S/P converter 208 corresponds to the total number of subcarriers utilized in data transmission (16 subcarriers in our example). Now, the S/P converter 208 forwards the symbols allocated to the truncated subcarriers to the corresponding branches, i.e. branches corresponding to subcarriers S2, S8, S10, and S12, and the symbols allocated to the non-truncated subcarriers to the other branches according to the allocation information. The symbols in parallel branches are then fed to an inverse Fourier transformer 210.

The inverse Fourier transformer 210 assigns the input symbols into the corresponding subcarrier frequencies. Accordingly, the inverse Fourier transformer 210 may be seen as a multicarrier modulator. The inverse Fourier transformer 210 may utilize inverse fast Fourier transform (IFFT) in this process, as is well known in multicarrier transmission techniques. The inverse Fourier transformer 210 assigns a symbol in each input branch to a specific subcarrier frequency. After the assignment (or after the IFFT), the inverse Fourier transformer 210 may truncate the determined subcarriers on the basis of the message of the truncated subcarriers received from the ordering block 206. The multicarrier modulated, non-truncated symbols (OFDM symbols) are then fed to a cyclic prefix insertion block 212 which adds a cyclic prefix at the start of each OFDM symbol for inter-symbol interference rejection. The cyclic prefix insertion block 212 also converts the parallel symbols into a serial form and feeds them to a digital-to-analog (D/A) converter 214 for D/A conversion. The D/A converted symbols, i.e. a multicarrier radio signal to be transmitted, are converted to a radio frequency, further amplified and transmitted through an antenna of the radio transmitter 120.

Of course, the data bits to be transmitted may be processed with other procedures than those described above but the description of the other procedures is omitted for the sake of simplicity.

Figure 4:
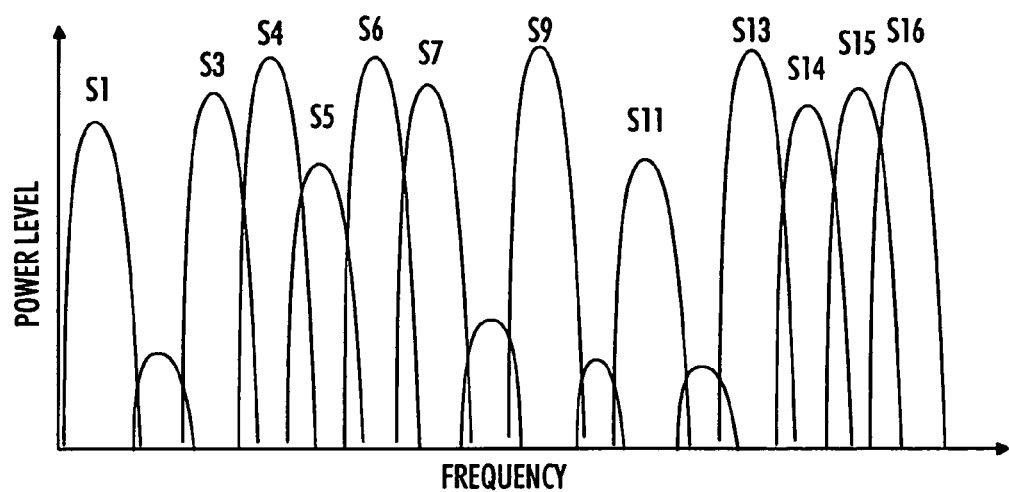
FIG. 4 illustrates subcarriers of a multicarrier signal received at the radio receiver according to an embodiment of the invention.

An antenna of the radio receiver 100 receives the multicarrier radio signal transmitted from the radio transmitter 120. Accordingly, the received multicarrier radio signal has propagated through a radio channel, and suffered from fading. Different subcarriers of the received multicarrier radio signal may have suffered from the fading differently. FIG. 4 illustrates an example of the received multicarrier signal. The fading suffered by the received multicarrier signal may correspond to the channel state information obtained by the radio transmitter 120 from the radio receiver, as described above. When comparing the attenuation of different subcarriers in FIG. 4 with the channel state information illustrated in FIG. 3, a correspondence may be perceived. The received subcarriers have faded in a similar way as described by the channel state information. This is also valid on real implementations as long as the properties of the radio channel to not change rapidly.

In FIG. 4, frequency components corresponding to the truncated subcarriers, i.e. subcarriers that were not actually transmitted, contain signal components, too. These signal components represent noise and interfering signals propagated from signal sources other than the radio transmitter 120. These signal components may be commonly denoted as noise. The subcarriers carrying transmitted symbols are also corrupted by noise which may cause errors in signal detection. This will be discussed below.

The multicarrier signal received through the antenna of the radio receiver may be first filtered, amplified, and converted from a radio frequency to a base band (not shown). Then, an analog-to-digital (A/D) converter 216 converts the analog signal into digital samples. The received signal, which is now in serial form, is then converted into a parallel form. This may be carried out by the A/D converter, which may be configured to output a given number of consecutive digital samples into each output branch. Accordingly, digital samples corresponding to one received symbol are output to one output branch of the A/D converter 216 of FIG. 2. Now, the received symbols are in parallel form. The received symbols are then fed to a cyclic prefix removal block 218 which removes the cyclic prefix from the start of each received symbol. This may be carried out by eliminating a given number of first samples of each symbol. Accordingly, the effect of inter-symbol interference is mitigated from the received symbols. The received symbols, from which the cyclic prefix part has been removed, are then fed to a fast Fourier transformer (FFT) 220 which Fourier transforms the received symbols. The fast Fourier transformer 220 multicarrier-demodulates the received symbols but also converts them into a frequency domain.

The frequency domain representation of the received symbols may be fed to a channel estimator 224 and to a parallel-to-serial converter 222. The channel estimator 224 estimates attenuation effected to each subcarrier by the radio channel. The channel estimator 224 may utilize the pre-knowledge of transmit powers allocated to each subcarrier at the radio transmitter 120. The channel estimator 224 then outputs the information on the attenuation of each subcarrier to an equalizer 228. The channel estimator 224 is also configured to calculate the channel state information from a received pilot signal by calculating attenuation on every subcarrier used for carrying the pilot signal. In our example, the received symbols are other than pilot symbols and, thus, the channel state information is not calculated from these symbols. The channel state information may, however, be calculated from the received subcarriers carrying the received symbols. The attenuation of the truncated subcarriers may also be estimated. Then, the radio receiver 100 may transmit the new channel state information to the radio transmitter 120 in order to update the channel state knowledge possessed by the radio transmitter 120. This updated channel state knowledge may then be utilized in the data transmission until the radio transmitter 120 again receives update for the channel state information from the radio receiver 100.

The parallel-to-serial converter 222 converts the frequency-domain representations of the received symbols now in parallel form into a serial form and forwards them to a noise reduction block 226.

The noise reduction block 226 mitigates the noise from the received symbols. The noise reduction block 226 may estimate a variance value describing the noise power from the signals on the truncated subcarriers. As mentioned above, the signal on the truncated subcarriers represents noise and, thus, the noise variance may be easily calculated from the truncated subcarriers, since there is no information signal (no symbols) hindering the noise variance estimation. Then, the received symbols are fed to the equalizer 228 for channel attenuation compensation. The equalizer 228 may be a one-tap equalizer which equalizes the received symbols on the basis of the attenuation information and noise variance received from the channel estimator 224 and the noise reduction block 226.

The equalizer 228 outputs the equalized symbols to a reordering block 230 which reorders the received symbols into a correct order. The reordering block 230 has known the channel state information in advance. The correct order of the received symbols may be calculated in a similar way as was done at the radio transmitter 120. The received symbols are then fed to a demodulator 232 in the correct order.

The demodulator 232 demodulates and detects the received symbols. The demodulator 232 may demodulate and detect only the symbols associated with the non-truncated subcarriers. Accordingly, the demodulator 232 may be configured not to carry out the demodulation and/or detection for the samples set to zero by the equalizer. Demodulation and detection of these symbols would be unnecessary, since they do not contain any information. As a result, detected data bits are obtained. The detected data bits are then fed to an LDPC decoder 234. Then, the LDPC decoder 234 carries out the decoding process.

In a decoding process, the LDPC decoder 234 processes the detected data bits in order to find out the values of the data bits that were allocated to the truncated subcarriers. The LDPC decoder 234 utilizes the same parity check matrix the LDPC encoder 200 utilized when encoding the data bits. Now, the LDPC decoder 234 calculates the missing data bits, i.e. the data bits allocated to the truncated subcarriers, from the detected data bits according to the parity check equations defined by the parity check matrix. Even erroneously received bits may be corrected through calculation of the parity check equations. The LDPC decoder 234 may utilize, for example, a "belief propagation" algorithm which has been found to be an efficient decoding algorithm in conjunction with LDPC codes.

The basic idea of the present invention is to allocate bits encoded with a high variable node degree LDPC code to subcarriers which are known to suffer only a mild attenuation in the radio channel. The knowledge of the attenuation is obtained from the channel state information transmitted from the radio receiver 100 to the radio transmitter 120. Thus, a reliable data transmission is guaranteed for those data bits. Loss of data bits due to truncation (or erasure) of subcarriers and the bit errors caused by the attenuation of the subcarriers carrying data bits encoded LDPC code are handled by the LDPC decoder 234 by utilizing the reliably transmitted data bits. The reliably transmitted bits are utilized in calculating the parity check equations in order to find out the bits on the truncated subcarriers. The fixed truncation ratio (the ratio between the number of truncated subcarriers and the total number of subcarriers) ensures an efficient data transmission under any channel conditions. Particularly under poor channel conditions (several heavily attenuating subcarriers), the higher variable node degree of the less-attenuating subcarriers provides enough protection so that the bits on the truncated subcarriers and the increased bit error rate may be recovered. Additionally, truncation of a given number of subcarriers provides that more transmit power may be allocated to the other (non-truncated) subcarriers. Therefore, the bits carried by the non-truncated subcarriers may be transmitted even more reliably. For the actual power allocation, there are several possible schemes.

Figure 5A:
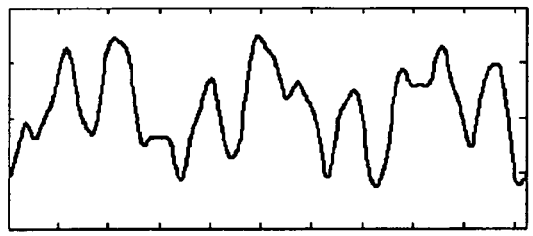
FIG. 5A illustrates channel state information utilized in an example used to describe an embodiment of the invention.
Figure 5B:
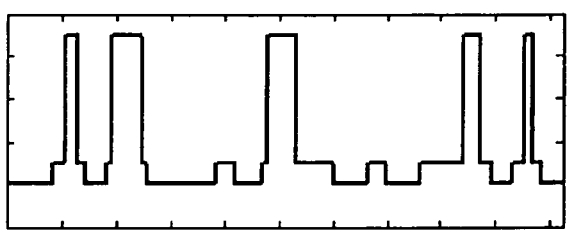
FIG. 5B illustrates allocation of transmission symbols to subcarriers according to an embodiment of the invention.
Figure 5C:
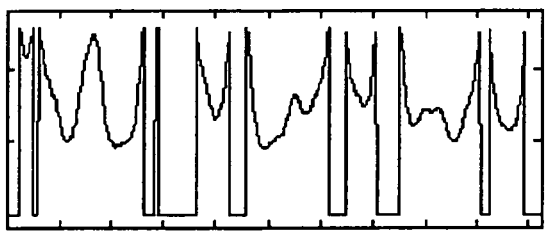
FIG. 5C illustrates allocation of available transmit power to subcarriers according to an embodiment of the invention.
Figure 5D:
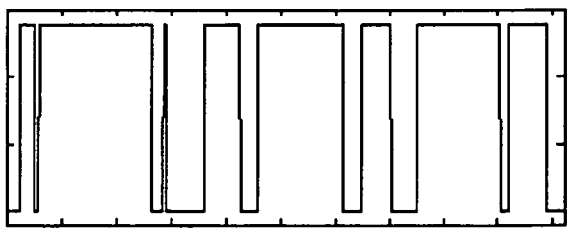
FIG. 5D illustrates allocation of available transmit power to subcarriers according to another embodiment of the invention.

FIGS. 5C and 5D illustrate two possible power allocation schemes in conjunction with FIGS. 5A and 5B. That is, FIGS. 5C and 5D illustrate two equivalent operational states for the power allocation block 207 of the radio transmitter 120. In this example, the total number of subcarriers is significantly higher than in the previous example which was described above with reference to FIG. 3. FIG. 5A illustrates channel state information transmitted from a radio receiver (for example, the radio receiver 100) to a radio transmitter (for example, the radio transmitter 120). The horizontal axis of FIG. 5A illustrates frequency index while the vertical axis describes gain effected by a radio channel to each frequency component (channel gain). In each of the FIGS. 5A to 5D, the horizontal axis illustrates the same frequency indices, i.e. it has the same scale. Therefore, functions related to different frequency indices (different subcarriers) may be studied and compared on that basis. In FIG. 5A, it can be seen that some frequency components suffer heavily from attenuation (illustrated as the steepest bottoms) while other frequency components suffer from a mild attenuation (illustrated as the highest peaks).

FIG. 5B illustrates the result of the allocation of the symbols to different subcarriers (the result of the operation of the ordering block 206). The vertical axis now indicates the variable node degree (the strength of the LDPC code associated with each symbol). As can be seen in FIG. 5B, three different variable node degrees are utilized. When studying FIG. 5B in conjunction with FIG. 5A, it can be seen that the symbols associated with the highest variable node degree are allocated to the frequency indices (subcarriers) suffering the least from the attenuation. Correspondingly, the symbols associated with the second highest variable node degree are allocated to the frequency indices (subcarriers) suffering moderately from the attenuation. Furthermore, the symbols associated with the lowest variable node degree are allocated to the frequency indices (subcarriers) suffering most heavily from the attenuation.

FIG. 5D illustrates a constant power allocation scheme in which the same transmit power is allocated to each non-truncated subcarrier. In other words, the total transmit power available for the radio transmitter 120 is divided equally to every non-truncated subcarrier. In FIG. 5, the vertical axis defines the transmit power level. Let us define a symbol transmitted on a subcarrier k as $D_k$. Accordingly, the transmission symbol after power allocation becomes:

$$D'_k = \sqrt{P_k} D_k, \quad (1)$$

where $P_k$ is the transmit power of the $k^{th}$ subcarrier defined by:

$$P_k = \begin{cases} \frac{1}{1-TR}, & k \subset \text{non-truncated} \\ 0, & k \subset \text{truncated} \end{cases} \quad (2)$$

where TR is the truncation ratio. The upper portion of equation (2) is applied to the non-truncated subcarriers and the lower portion is applied to the truncated subcarriers. $P_k=0$ implies that no symbol is transmitted on that given subcarrier. When studying FIG. 5D in conjunction with FIGS. 5A and 5B, it can be seen that transmit power of 0 is allocated for the subcarriers suffering the most from the attenuation. Additionally, a portion of the available transmit power is allocated to the subcarriers carrying symbols associated with the highest or the second highest variable node degree. The remaining transmit power is allocated to the subcarriers carrying symbols associated with the lowest variable node degree and suffering the least from the attenuation. Accordingly, the subcarriers carrying symbols associated with the lowest variable node degree and suffering the most from the attenuation are truncated.

FIG. 5C illustrates another power allocation scheme, referred to as "inverse water-filling scheme". According to the inverse water filling power allocation scheme, the available transmit power is allocated to the non-truncated subcarriers in inverse proportion to the channel gains of the non-truncated subcarriers. In FIG. 5C, the vertical axis defines the transmit power level. The transmit power allocated to the $k^{th}$ subcarrier may be defined as:

$$P_k = \begin{cases} \frac{E}{\lambda_k}, & k \subset \text{non-truncated} \\ 0, & k \subset \text{truncated} \end{cases} \quad (3)$$

where $\lambda_k$ represents the channel gain of the $k^{th}$ subcarrier obtained from the channel state information. E is a constant which is calculated in advance to ensure that the total average transmit power of the radio transmitter 120 remains the same, i.e. that the total transmit power available for the radio transmitter 120 is not exceeded. When studying FIG. 5C in conjunction with FIG. 5A, it can be seen that a higher transmit power level is assigned to the non-truncated subcarriers suffering from a higher attenuation (lower channel gain) in the radio channel. Additionally, a transmit power level of zero is allocated to the truncated subcarriers regardless of the channel gain of the truncated subcarriers.

Figure 6:
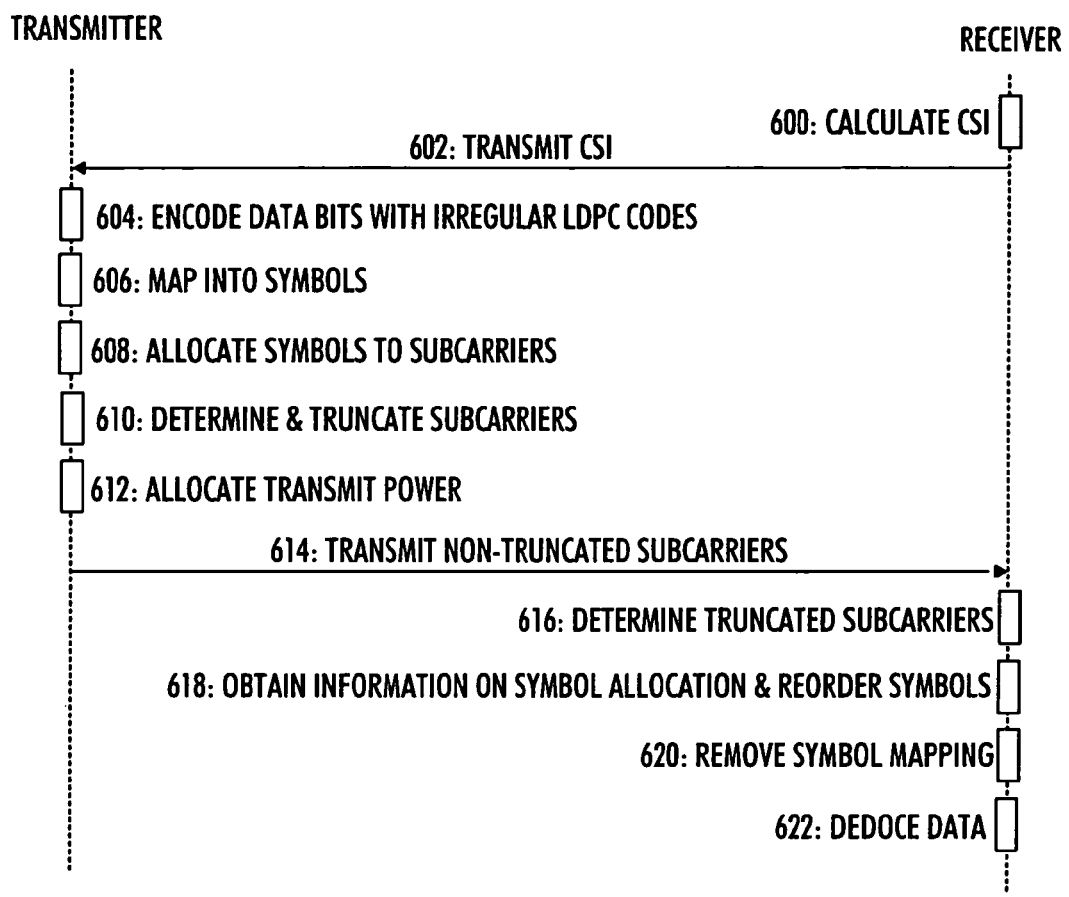
FIG. 6 is a flow diagram illustrating a data transmission process and a data reception process according to embodiments of the invention.

Next, a data transmission and a data reception process according to embodiments of the invention will be described with reference to the signaling diagram shown in FIG. 6. The signaling is carried out between a radio transmitter (for example, the radio transmitter 120) and a radio receiver (for example, the radio receiver 100). The data transmission between the radio transmitter and the radio receiver is based on a multicarrier data transmission, for example OFDM, technology.

In 600, the radio receiver calculates channel state information from a pilot signal transmitted from the radio transmitter to the radio receiver. The calculated channel state information comprises information on attenuation of different frequency components utilized in the data transmission, the attenuation being affected by a radio channel. In 602, the radio receiver transmits the channel state information to the radio transmitter so that the radio transmitter may utilize this knowledge in the data transmission.

In 604, the radio transmitter channel encodes data bits to be transmitted by utilizing irregular LDPC codes. Accordingly, the data bits are encoded with different variable node degrees such that some bits are encoded with the highest variable node degree (the highest number of parity check equations) while the other data bits are encoded with a lower variable node degree (lower number of parity check equations). In 606, the radio transmitter maps the encoded data bits into symbols according to a determined symbol constellation.

In 608, the symbols are allocated to subcarriers of a multicarrier signal. The allocation is carried out on the basis of the channel state information received from the radio receiver such that the symbols associated with an LDPC code having a higher variable node degree are allocated to the subcarriers suffering the least from the attenuation in the radio channel. On the contrary, the symbols associated with an LDPC code having a lower variable node degree are allocated to the subcarriers suffering more from the attenuation in the radio channel.

In 610, the radio transmitter determines a number of subcarriers to be truncated on the basis of the channel state information. The number of subcarriers to be truncated relative to the total number of subcarriers utilized in the data transmission is fixed. The determined number of subcarriers suffering the most attenuation are truncated, i.e. the symbols allocated to the truncated subcarriers will not be transmitted.

In 612, the radio transmitter allocates the total transmit power available for the data transmission to the non-truncated subcarriers. Preferably, the radio transmitter utilizes the inverse waterfilling power allocation scheme described above.

In 614, the multicarrier signal comprising the non-truncated subcarriers is transmitted from the radio transmitter to the radio receiver.

In 616, the radio receiver determines which subcarriers of the received multicarrier signal have been truncated by the radio transmitter. This may be determined from the same channel state information the radio receiver calculated in 600 in a similar way as the radio transmitter did in 610. Then, the radio receiver obtains the symbols from the subcarriers determined to be carrying the transmitted symbols, i.e. the non-truncated subcarriers, and sets the other subcarriers (the truncated subcarriers) to zero in order to mitigate interference.

In 618, the radio receiver obtains information on the allocation of the symbols to the non-truncated subcarriers. This information may be obtained from the same channel state information the radio receiver calculated in 600 in a similar way as the radio transmitter did in 608. Then, the radio receiver reorders the symbols into a correct order on the basis of this information.

In 620, the radio receiver removes mapping of the reordered symbols, thereby obtaining encoded data bits, and in 622, the radio receiver decodes the data bits.

The embodiments of the invention may be realized in a radio transmitter and a radio receiver, both comprising a communication interface and a processing unit. The processing unit of the radio transmitter may be configured to perform at least some of the steps described in connection with the signaling diagram of FIG. 6 and in connection with FIGS. 2, 3 and 5A to 5D. The processing unit of the radio receiver may be configured to perform at least some of the steps described in connection with the signaling diagram of FIG. 6 and in connection with FIGS. 2 and 4. The embodiments may be implemented as computer programs comprising instructions for executing a computer process for data transmission in the radio transmitter and a computer process for data reception in the radio receiver.

Each of the computer programs may be stored on a computer program distribution medium readable by a computer or a processor. The computer program medium may be, for example but not limited to, an electric, magnetic, or semiconductor system or device. The computer program medium may include at least one of the following media: a computer readable medium, a program storage medium, a record medium, a computer readable memory, a random access memory, and an erasable programmable read-only memory.

Even though the invention has been described above with reference to an example according to the accompanying drawings, it is clear that the invention is not restricted thereto but it can be modified in several ways within the scope of the appended claims.

The invention claimed is:

1. A method comprising:
obtaining, in a radio transmitter of a wireless multicarrier communication system, channel state information describing attenuation effected by a radio channel to subcarriers used in the data transmission;
encoding, in the radio transmitter, different portions of a plurality of data bits with different degrees, the degree of an encoded data bit being defined by the number of parity check equations protecting the data bit;
mapping, in the radio transmitter, encoded data bits to symbols;
allocating, in the radio transmitter, the symbols to subcarriers on the basis of the channel state information and the degree of encoded bits associated with each symbol;
determining, in the radio transmitter on the basis of the channel state information, a number of subcarriers to be truncated due to high attenuation, the number of subcarriers to be truncated relative to the total number of subcarriers being substantially fixed;
allocating symbols comprising encoded data bits protected by higher number of parity check equations on the subcarriers that are not determined to be truncated and allocating symbols comprising encoded data bits protected by lower number of parity check equations on the subcarriers that are determined to be truncated;
truncating, in the radio transmitter, the determined subcarriers and symbols on the determined subcarriers;
allocating, in the radio transmitter, the available transmit power to the non-truncated subcarriers, and
transmitting a multicarrier signal comprising symbols on the non-truncated subcarriers.

2. The method of claim 1, wherein the plurality of data bits is encoded with an irregular low-density parity check (LDPC) channel code.

3. The method of claim 1, wherein the available transmit power is allocated on the basis of the channel state information.

4. The method of claim 3, wherein the available transmit power is allocated to each of the non-truncated subcarriers proportionally to the attenuation of the corresponding non-truncated subcarrier, the attenuation being described by the channel state information.

5. The method of claim 4, wherein more transmit power is allocated to heavily attenuating subcarriers and less transmit power is allocated to the mildly attenuating subcarriers.

6. The method of claim 1, wherein the allocation of symbols to subcarriers is carried out by allocating symbols, each comprising one or more data bits encoded with a high degree, to less-attenuating subcarriers and symbols, each comprising one or more data bits encoded with a low degree, to heavily attenuating subcarriers.

7. The method of claim 1, wherein the channel state information is received from a radio receiver and the multicarrier signal comprising the symbols on the non-truncated subcarriers is transmitted to the radio receiver from which the channel state information was received.

8. The method of claim 1, further comprising omitting transmission of symbols allocated to the truncated subcarriers in response to the truncation of the determined subcarriers.

9. An apparatus comprising:
a processing unit; and memory including computer program code, the memory and computer program code configured to, with the processing unit, cause the apparatus at least to: obtain channel state information describing attenuation effected by a radio channel to subcarriers the apparatus uses in data transmission, encode different portions of a plurality of data bits with different degrees, the degree of an encoded data bit being defined by the number of parity check equations protecting the data bit, map encoded data bits to symbols, allocate the symbols to subcarriers on the basis of the channel state information and the degree of encoded bits associated with each symbol, determine, on the basis of the channel state information, a number of subcarriers to be truncated due to high attenuation, the number of subcarriers to be truncated relative to the total number of subcarriers used in the data transmission being substantially fixed, allocate symbols comprising encoded data bits protected by higher number of parity check equations on subcarriers that are determined to not be truncated and allocate symbols comprising encoded data bits protected by lower number of parity check equations on subcarriers that are determined to be truncated, truncate the determined subcarriers and symbols on the determined subcarriers, allocate the available transmit power to the non-truncated subcarriers, and control the apparatus to transmit a multicarrier signal comprising the symbols on the non-truncated subcarriers.

10. The apparatus of claim 9, wherein the processing unit is further configured to encode the plurality of data bits with irregular low-density parity check (LDPC) channel codes.

11. The apparatus of claim 9, wherein the processing unit is further configured to allocate the available transmit power on the basis of the channel state information.

12. The apparatus of claim 11, wherein the processing unit is further configured to allocate the available transmit power to each of the non-truncated subcarriers proportionally to the attenuation of the corresponding non-truncated subcarrier, the attenuation being described by the channel state information.

13. The apparatus of claim 11, wherein the processing unit is further configured to allocate more transmit power to heavily attenuating subcarriers and less transmit power is allocated to the mildly attenuating subcarriers.

14. The apparatus of claim 9, wherein the processing unit is further configured to carry out the allocation of symbols to subcarriers by allocating symbols, each comprising one or more data bits encoded with high degree, to less-attenuating subcarriers and symbols, each comprising one or more data bits encoded with low degree, to heavily attenuating subcarriers.

15. The apparatus of claim 9, wherein the processing unit is further configured to receive the channel state information from a radio receiver, and transmit the multicarrier signal comprising the symbols on the non-truncated subcarriers to the radio receiver from which the channel state information was received.

16. The radio transmitter of claim 9, wherein the processing unit is further configured to control the radio transmitter to omit transmission of symbols allocated to the truncated subcarriers in response to the truncation of the determined subcarriers.

17. An apparatus comprising:
a processing unit; and
memory including computer program code, the memory and computer program code configured to, with the processing unit, cause the apparatus at least: to obtain channel state information from a signal received from a radio transmitter, the channel state information describing attenuation effected by a radio channel to subcarriers of a multicarrier signal the radio transmitter uses in data transmission, to transmit the channel state information to the radio transmitter, to receive a multicarrier signal comprising a plurality of subcarriers carrying symbols through the communication interface, wherein the symbols have been allocated to the subcarriers on the basis of the channel state information and degree of encoded bits associated with each symbol, the degree of an encoded data bit being defined by the number of parity check equations protecting the data bit such that symbols comprising encoded data bits protected by higher number of parity check equations have been allocated on the received subcarriers and symbols comprising encoded data bits protected by lower number of parity check equations have been allocated on the subcarriers that were truncated, to determine which subcarriers of the received multicarrier signal have been truncated, the number of truncated subcarriers relative to the total number of subcarriers used in the data transmission being substantially fixed, to obtain the symbols from non-truncated subcarriers, to obtain information on the allocation of the symbols to the subcarriers, to order the symbols on the basis of the obtained information, to remove mapping of the ordered symbols, thereby obtaining encoded data bits, and to decode the encoded data bits by determining bit values of symbols allocated to the truncated subcarriers from the encoded bits allocated to the non-truncated subcarriers.

18. The apparatus of claim 17, wherein the processing unit is further configured to calculate a noise variance from a frequency band of one or more subcarriers not carrying a symbol and suppress noise from the received multicarrier signal on the basis of the calculated noise variance.

19. The apparatus of claim 17, wherein the processing unit is further configured to determine the truncated subcarriers from the obtained channel state information.

20. The apparatus of claim 17, wherein the processing unit is further configured to obtain the information on the allocation of the symbols to the subcarriers from the obtained channel state information.

21. A multicarrier wireless communication system, comprising:
a radio transmitter comprising a communication interface to provide a radio communication connection with at least one radio receiver, and a processing unit configured to obtain channel state information describing attenuation effected by a radio channel to subcarriers the radio transmitter uses in data transmission, encode different portions of a plurality of data bits with different degrees, the degree of an encoded data bit being defined by the number of parity check equations protecting the data bit, map encoded data bits to symbols, allocate the symbols to subcarriers on the basis of the channel state information and the degree of encoded bits associated with each symbol, determine, on the basis of the channel state information, a number of subcarriers to be truncated due to high attenuation, the number of subcarriers to be truncated relative to the total number of subcarriers used in the data transmission being substantially fixed, allocate symbols comprising encoded data bits protected by higher number of parity check equations on subcarriers that are determined not to be truncated and allocate symbols comprising encoded data bits protected by lower number of parity check equations on subcarriers determined to be truncated, truncate the determined subcarriers and symbols on the determined subcarriers, allocate the available transmit power to the non-truncated subcarriers, and control the radio transmitter to transmit, through the communication interface, a multicarrier signal comprising the symbols on the non-truncated subcarriers, and
a radio receiver comprising a communication interface to provide a radio communication connection with the radio transmitter, and a processing unit configured to obtain channel state information describing attenuation effected by a radio channel to subcarriers the radio transmitter uses in data transmission, transmit the channel state information to the radio transmitter through the communication interface of the radio receiver, receive a multicarrier signal comprising a plurality of subcarriers carrying symbols through the communication interface, determine which subcarriers of the received multicarrier signal have been truncated, the number of truncated subcarriers relative to the total number of subcarriers used in the data transmission being substantially fixed, obtain the symbols from non-truncated subcarriers, obtain information on the allocation of the symbols to the subcarriers, order the symbols on the basis of the obtained information, remove mapping of the ordered symbols, thereby obtaining encoded data bits, and decode the encoded data bits by determining bit values of symbols allocated to the truncated subcarriers from the encoded bits allocated to the non-truncated subcarriers.

22. A computer readable non-transitory medium encoding a computer program of instructions for executing a computer process for data transmission in a radio transmitter of a multicarrier wireless communication system, the process comprising:

obtaining channel state information describing attenuation effected by a radio channel to subcarriers used in the data transmission;

encoding different portions of a plurality of data bits with different degrees, the degree of an encoded data bit being defined by the number of parity check equations protecting the data bit;

mapping encoded data bits to symbols;

allocating the symbols to subcarriers on the basis of the channel state information and the degree of encoded bits associated with each symbol;

determining, on the basis of the channel state information, a number of subcarriers to be truncated due to high attenuation, the number of subcarriers to be truncated relative to the total number of subcarriers being substantially fixed;

allocating symbols comprising encoded data bits protected by higher number of parity check equations on the subcarriers that are not determined to be truncated and allocating symbols comprising encoded data bits protected by lower number of parity check equations on the subcarriers that are determined to be truncated;

truncating the determined subcarriers and symbols on the determined subcarriers;

allocating the available transmit power to the non-truncated subcarriers, and controlling the radio transmitter to transmit a multicarrier signal comprising symbols on the non-truncated subcarriers.

23. The computer medium of claim 22, the medium including at least one of the following media: a computer readable medium, a program storage medium, a record medium, and a computer readable memory.

* * * * *